United States Patent [19]

Gehrig

[11] Patent Number: 4,997,703

[45] Date of Patent: Mar. 5, 1991

[54] MOLDING MATERIAL CONTAINING FILLERS

[75] Inventor: Heinz Gehrig, Kaiserslautern, Fed. Rep. of Germany

[73] Assignee: BASF Aktiengesellschaft, Ludwigshafen, Fed. Rep. of Germany

[21] Appl. No.: 256,995

[22] Filed: Oct. 13, 1988

[30] Foreign Application Priority Data

Oct. 13, 1987 [DE] Fed. Rep. of Germany ....... 3734574

[51] Int. Cl.$^5$ .......................... B32B 5/14; B32B 5/30
[52] U.S. Cl. ................................. 428/283; 264/320; 427/407.3; 427/412; 428/284; 428/285; 428/286; 428/287; 428/290; 428/329; 428/331; 428/375; 428/396; 428/397; 428/408
[58] Field of Search ............... 428/283, 284, 285, 286, 428/287, 290, 329, 331, 375, 396, 397, 408; 427/407.3, 412

[56] References Cited

U.S. PATENT DOCUMENTS

| | | | |
|---|---|---|---|
| 3,850,723 | 11/1974 | Ackley | 264/322 |
| 4,310,585 | 1/1982 | Shannon | 428/218 |
| 4,522,673 | 6/1985 | Fell et al. | 428/251 |
| 4,751,134 | 6/1988 | Chenoweth et al. | 428/284 |

*Primary Examiner*—James C. Cannon
*Attorney, Agent, or Firm*—Oblon, Spivak, McClelland, Maier & Neustadt

[57] ABSTRACT

A molding material consists of a curable synthetic resin, reinforcing fibers and fillers, the synthetic resin being applied in two layers to the reinforcing fibers: In an inner layer, the reinforcing fibers are impregnated with a synthetic resin component A which contains up to 10% by weight of fillers, and, in an outer layer, the impregnated reinforcing fibers are coated or surrounded with a further synthetic resin component B which contains not less than 20% by weight of fillers, and the components A and B may contain similar or different synthetic resins.

8 Claims, 1 Drawing Sheet

MOLDING MATERIAL CONTAINING FILLERS

The present invention relates to a molding material which contains a curable synthetic resin, fillers and reinforcing fibers.

In the production of moldable semifinished products from curable synthetic resins, i.e. sheet molding compounds (SMC) or bulk molding compounds (BMC), reinforcing fibers in the form of webs or bands or in the form of unchopped or chopped rovings are impregnated with a matrix of synthetic resin and fillers in a batchwise or continuous impregnating apparatus.

In the impregnation of reinforcing materials, high filler contents are frequently desirable in order to improve, for example, the surface quality or the dimensional stability of finished articles. However, as the filler content increases, the adhesion between fibers and matrix deteriorates and furthermore the notch effect of the filler particles becomes greater, which also leads to a decrease in the strength and toughness of the cured moldings.

It is an object of the present invention to provide filler-containing molding materials which consist of fiber-reinforced curable synthetic resins and have good adhesion between the plastic matrix and the reinforcing fibers as well as good mechanical properties, even in the case of the high filler content.

We have found that this object is achieved, according to the invention, if the synthetic resin is applied in two layers to the reinforcing fibers:

A. in an inner layer, the fibers are impregnated with a synthetic resin component A which contains up to 10% by weight of fillers, and B. in an outer layer, the fibers impregnated with A are coated or surrounded with a further synthetic resin component B which contains not less than 20% by weight of fillers.

Regarding the individual components, the following may be stated:

1. Suitable curable resins are the known reaction resins. Unsaturated polyester resins, which are generally in the form of solutions of from 80 to 40% by weight of unsaturated polyester in from 20 to 60% by weight of a copolymerizable monomer, are preferred. The polyesters are condensates of polybasic, in particular dibasic, carboxylic acids and their esterifiable derivatives, in particular their anhydrides, which are bonded by ester-like bonds to polyhydric, in particular dihydric, alcohols, and may contain additional radicals of monobasic carboxylic acids or monohydric alcohols, and some or all of the starting materials must have ethylenically unsaturated, copolymerizable groups.

Suitable copolymerizable, ethylenically unsaturated monomeric compounds are the allyl and vinyl compounds usually used for the preparation of unsaturated polyester molding materials, preferably styrene.

Vinyl ester resins are also suitable. Useful vinyl ester resins having unsaturated terminal groups possess the typical group —CO—OCH$_2$CHOH—CH$_2$O— and contain polymerizable unsaturated terminal groups. The vinyl ester resins are prepared by reacting roughly stoichiometric amounts of a polyepoxide resin and an unsaturated monocarboxylic acid, for example methacrylic acid.

Epoxy resins which consist of a polyepoxide and a curing agent are also suitable. Preferred epoxides are reaction products of polyfunctional alcohols, phenols, cycloaliphatic carboxylic acids, aromatic amines or aminophenols with epichlorohydrin. Suitable curing agents are polyamines, polycarboxylic anhydrides and catalytic curing agents, eg. hydrazides.

Finally, it is also possible to use bismaleimide resins. These generally contain a bismaleimide, for example obtained from maleic anhydride and an aromatic diamine, and a comonomer, for example an aromatic diamine, a diphenol, an aminophenol or a diallyl or divinyl compound.

Identical or different synthetic resins may be used in the components A and B, the total resin content of the molding material preferably being 15–60, in particular 20–50, % by weight.

2. Suitable reinforcing fibers are the conventional fibers consisting of glass, carbon and aromatic polyamide, as well as metal, boron and silicate fibers. They may be in the form of rovings, which consist of a large number of individual filaments and generally have diameters of from 5 to 25 μm. They may also be used in the form of bands having a width of from 1 to 500 cm and consisting of a large number of parallel rovings, or in the form of webs, for example mats, surface mats, woven fabrics or knitted fabrics, having a width of from 10 to 1,500 cm and a thickness of from 0.2 to 50 mm.

The content of reinforcing fibers in the molding material is preferably 10–80, in particular 20–60, % by weight.

3. Suitable fillers are, for example, finely powdered or particulate, preferably inorganic fillers, such as chalk, kaolin, powdered quartz, dolomite, barite, metal powders, aluminum oxide hydroxide, talc, kieselguhr, pigments and wood meal.

The content of fillers in the molding material is preferably 10–70%, in particular 30–60, % by weight.

4. Other suitable conventional additives are: inhibitors, such as hydroquinones, quinones, nitrobenzenes, N-nitroso compounds, salts of divalent copper and quaternary ammonium salts, polymerization initiators, such as benzoyl peroxide, methyl ethyl ketone peroxide, tert-butyl peroctoate, tert-butyl perbenzoate, cyclohexanone peroxide, acetylacetone peroxide, perketals, percarbonates, C-C-labile compounds and azo compounds, curing accelerators, eg. octoates and naphthenates of copper, lead, calcium, magnesium, cerium and in particular of manganese and cobalt, as well as aromatic amines, such as dimethylaniline and diethylaniline, photoinitiators, such as benzil ketals, benzoin ethers or acylphosphine oxides, shrinkage-reducing polymers, such as polystyrene, polymethyl methacrylate, polyvinyl acetate, polyethylene, polybutadiene and graft copolymers, copolymers and condensation polymers, such as saturated polyesters or polyesterurethanes, elastifying additives, for example rubber-like block copolymers and modified polytetrahydrofuran, thickeners, such as oxides or hydroxides of lithium, of magnesium, of calcium, of aluminum or of titanium, and isocyanates, thickening accelerators, eg. ammonium chlorides, phosphonium chlorides, sulfonium halides, water, polyols or propane-1,2-diol, Lubricants, such as zinc stearate, magnesium stearate and calcium stearate as well as polyalkylene ether waxes, flameproofing agents, such as halogen compounds or phosphorus compounds, and paraffins for reducing the evaporation of monomers and for forming a non-tacky surface.

The novel molding material is advantageously prepared by first impregnating reinforcing fibers with a synthetic resin component A which may contain up to 10, preferably up to 5, % by weight of fillers, in particular no fillers at all, and then coating or surrounding the impregnated fibers with a synthetic resin component B which contains not less than 20, preferably from 25 to 75, % by weight of fillers. During the impregnation, the spaces between the individual filaments of the reinforcing fibers are completely filled with component A, which has good wetting properties and good adhesion to the fibers. Thereafter, in a second operation, the reinforcing material impregnated with A is coated or surrounded with the component B, and the outer layer may furthermore contain a synthetic resin which differs from that of the inner layer.

The two operations can be carried out directly in succession (on-line). However, the semifinished product can also be temporarily stored after the impregnation step and, for example, thickening of the molding material may be effected. Only thereafter is the outer layer applied. If necessary, further layers may also be applied in the same manner.

Suitable impregnating apparatuses are the conventional impregnating and coating apparatuses, for example impregnating baths, impregnating chambers, kneaders, mixers and spreading and drawing apparatuses. A preferred apparatus, which is particularly suitable for impregnating rovings and bands, is described in EP-A 206 134. The impregnated or coated fiber materials can be drawn out of the impregnating apparatuses, for example, by means of winding machines, reels, grippers or caterpillar or screw machines.

Rovings impregnated and coated according to the invention can be chopped and then further processed as BMC for injection molding. However, it can also be wound on mandrels, and hollow articles produced in this manner.

Bands and webs impregnated and coated according to the invention, in sheet-like form having thicknesses up to a few cm, can be spread out as SMC materials, for example in the form of sheets, and, if required, may be draped one on top of the other in various preferred fiber directions.

The novel molding materials can be further processed by molding, for example pressing, embossing, bending or deep drawing. Curing to give the finished molding is carried out simultaneously or subsequently, for example by heating or irradiation.

In the further processing of the molding materials to give finished articles, a mixed zone may form in the boundary region of layers A and B, although this does not adversely affect the excellent impregnation of the reinforcing fibers. In finished articles consisting of the novel molding materials, the two layers can be identified by grinding.

In the drawings, two preferred embodiments are shown schematically.

Figure 1:
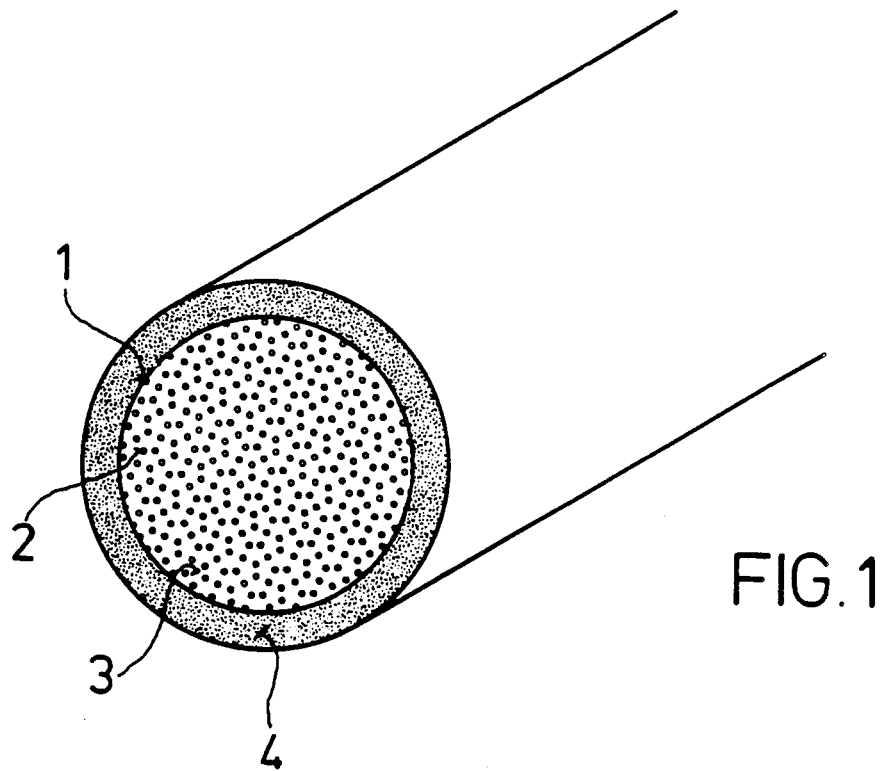
FIG. 1 shows a roving (1) which consists of a plurality of individual filaments (2). It is impregnated with the synthetic resin component A in the first layer (3) and surrounded with the synthetic resin component B in the second layer (4).
Figure 2:
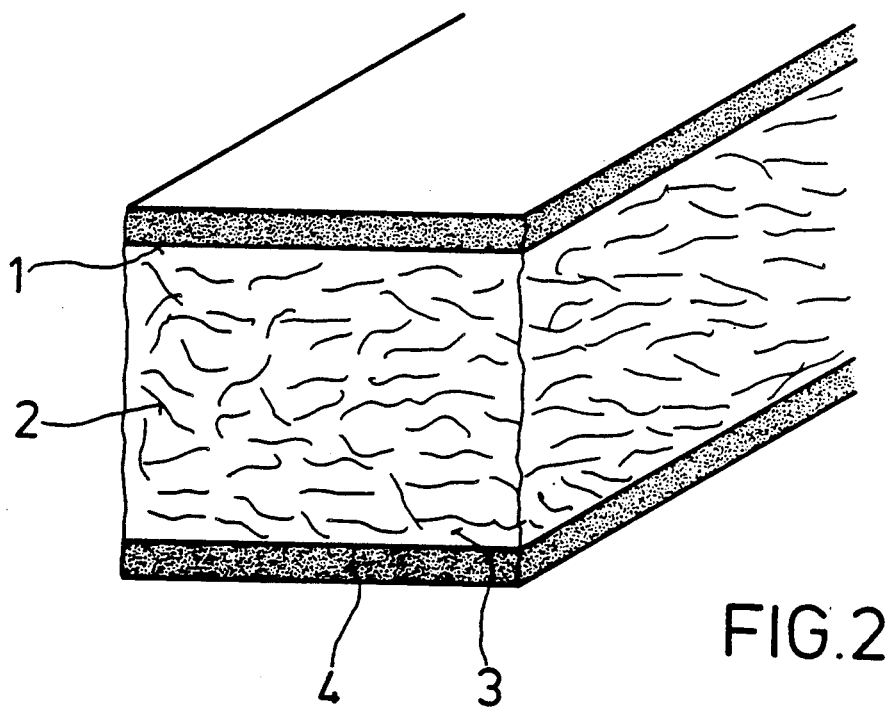
FIG. 2 shows a fiber mat (1) which consists of a large number of unoriented fibers (2). It is impregnated with the synthetic resin component A in the inner layer (3) and coated with the synthetic resin component B in the outer layer (4).

I claim:

1. A filler-containing molding material, containing
   a curable synthetic resin,
   reinforcing fibers in the form of rovings, bands or webs, and fillers,
   wherein the synthetic resin is applied in two layers to the reinforcing fibers:
   in an inner layer, the fibers are impregnated with resin component A are synthetic resin component A which contains up to 10% by weight of fillers, and
   in an outer layer, the fibers impregnated with resin component A are coated or surrounded with a further synthetic resin component B which contains not less than 20% by weight fillers.

2. A filler-containing molding material as claimed in claim 1, containing
   15–60% by weight of synthetic resin,
   10–80% by weight of reinforcing fibers,
   10–70% by weight of fillers and
   0–30% by weight of compatible additives,
   the percentages summing to 100.

3. A filler-containing molding material as claimed in claim 1, wherein the components A and B contain similar synthetic resins.

4. A filler-containing molding material as claimed in claim 1, wherein the components A and B contain different synthetic resins.

5. A filler-containing molding material as claimed in claim 1, wherein the amount of component A is 10–90% by volume and the amount of the outer component B is 90–10% by volume, the percentages in each case being based on the sum of synthetic resin, fillers and any additives.

6. A molding material as claimed in claim 1, wherein the impregnated and coated reinforcing fibers are chopped.

7. An molding material as claimed in claim 1, wherein the impregnated and coated reinforcing fibers are spread out in sheet-like form.

8. A process for preparing the molding material of claim 1 comprising:
   impregnating reinforcing fibers with a synthetic resin component A that contains up to 10% by weight of fillers; then
   coating or surrounding said impregnated fibers with a synthetic resin component B that contains not less than 20% by weight of fillers.

* * * * *